Dec. 23, 1941.    O. S. WILLIAMS    2,267,227
TRACTOR CAB
Filed April 19, 1939    3 Sheets-Sheet 1

Inventor
Oscar Stanley Williams
By J. Preston Swecker his Attorney.

Dec. 23, 1941.   O. S. WILLIAMS   2,267,227
TRACTOR CAB
Filed April 19, 1939   3 Sheets-Sheet 2
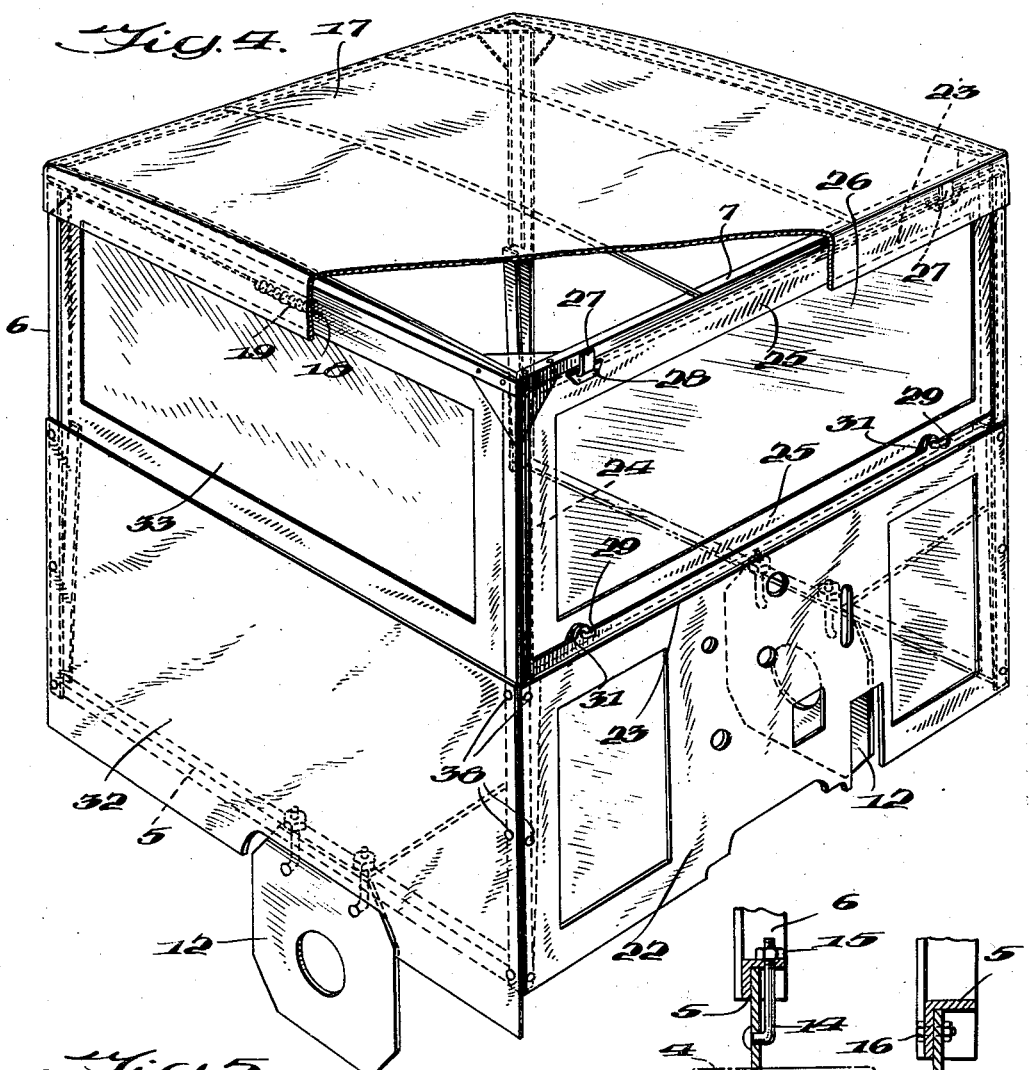
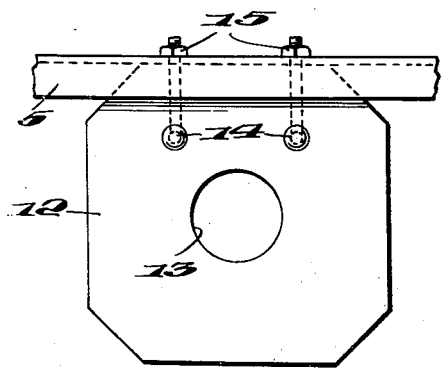
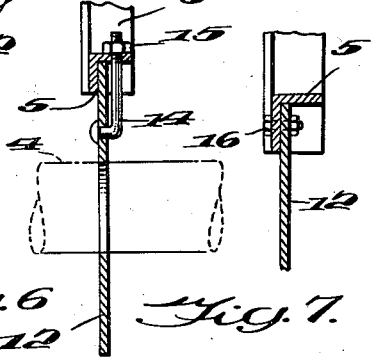
Inventor
Oscar Stanley Williams
By J. Preston Sweeker
his Attorney Dec. 23, 1941.　　　O. S. WILLIAMS　　　2,267,227
TRACTOR CAB
Filed April 19, 1939　　　3 Sheets-Sheet 3

Inventor
Oscar Stanley Williams
By J. Preston Swecker
Attorney

Patented Dec. 23, 1941

2,267,227

UNITED STATES PATENT OFFICE 2,267,227

TRACTOR CAB

Oscar Stanley Williams, Rushville, Ind.

Application April 19, 1939, Serial No. 268,829

17 Claims. (Cl. 296—102)

This invention relates to an improvement in tractor cabs, particularly for use on farm or commercial tractors or similar motor vehicles which are not ordinarily constructed with an enclosed driving compartment.

Tractors have been manufactured frequently heretofore without an enclosed cab or enclosed driving compartment, but where such tractors are to be used on farms or other open work, it is very desirable to provide an enclosure for the operator for improved comfort and operation under conditions which would not be practical without such enclosure.

It has been proposed heretofore to provide cabs or enclosures for commercial tractors but where these were built into the tractor structure they have been too expensive for the usual farm tractor, and not readily removable when they are not desired for use, particularly during the summer months. On the other hand, such removable cabs as have been proposed heretofore, have not been practical in operation, nor readily removable from the tractor.

The object of this invention is to improve the construction of the tractor cab; to make it economical for use, to provide adequate protection for the operator from the weather with great latitude in the amount of protection provided according to different weather conditions; to provide sufficient visibility for practical operation under all conditions; to provide lightness in weight consistent with strength and utility for the purpose of economy and also to avoid excessive weight resulting in undue deterioration of the cab under the severe shaking and vibration caused by the operation of the tractor over the usual rough terrain; to provide for ready entrance and exit of the operator; and to facilitate ready removal of the cab from the tractor when not required or desired, which is very important because many of the farm tractors are used under conditions or with implements where the cab would be objectionable, and yet at other times it would be very advantageous if it may be readily applied and used. Due to occasional dusty operating conditions and slow motion usual with tractors, entirely removable front, side, and rear walls of cab would be virtually necessary at times to alleviate this condition.

In carrying out these objects, the preferred embodiment of my invention utilizes a rigid frame, preferably constructed of angle bars joined together to support a top and provided with means for attachment of sides, including removable windows that are readily opened or removed as desired. The frame is provided with means for readily attaching it to the tractor frame or detaching the same therefrom.

I have illustrated a preferred embodiment of the invention in the accompanying drawings in which:

Fig. 4 is a perspective view of the cab removed, with a portion of the top broken away and in section for clearness;

Fig. 5 is a detail side elevation of the fastening for the cab on the tractor;

Fig. 6 is a vertical sectional view therethrough;

Fig. 7 is a similar view showing a modified form of fastening;

Figure 1:
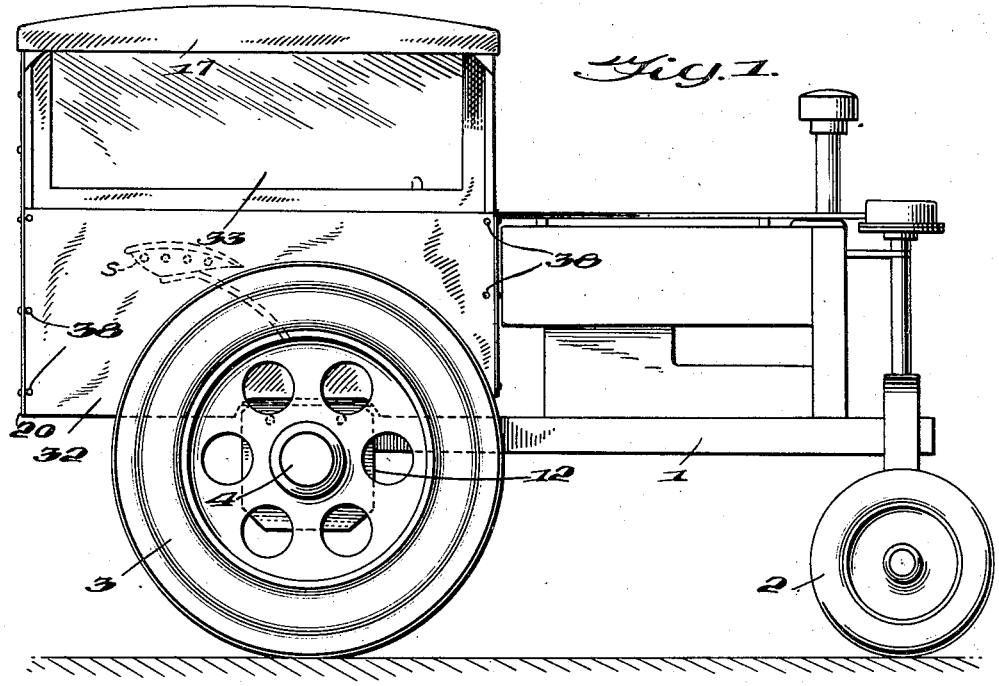
Fig. 1 is a side elevation of the cab applied to a conventional form of farm tractor.

The tractor illustrated in Fig. 1 is of a conventional construction designed for farm use, and is designated generally by the numeral 1 and is shown as having front and rear wheels 2 and 3, respectively, the latter being provided with the usual rear axles and axle housings designated generally by the numeral 4. It is evident, however, that the invention is applicable to any of the usual types of farm or commercial tractors where the use of such a cab or enclosed driver's compartment may be desirable enclosing the space about the driver's seat or supporting portion, designated generally at S.

Figures 8, 9:
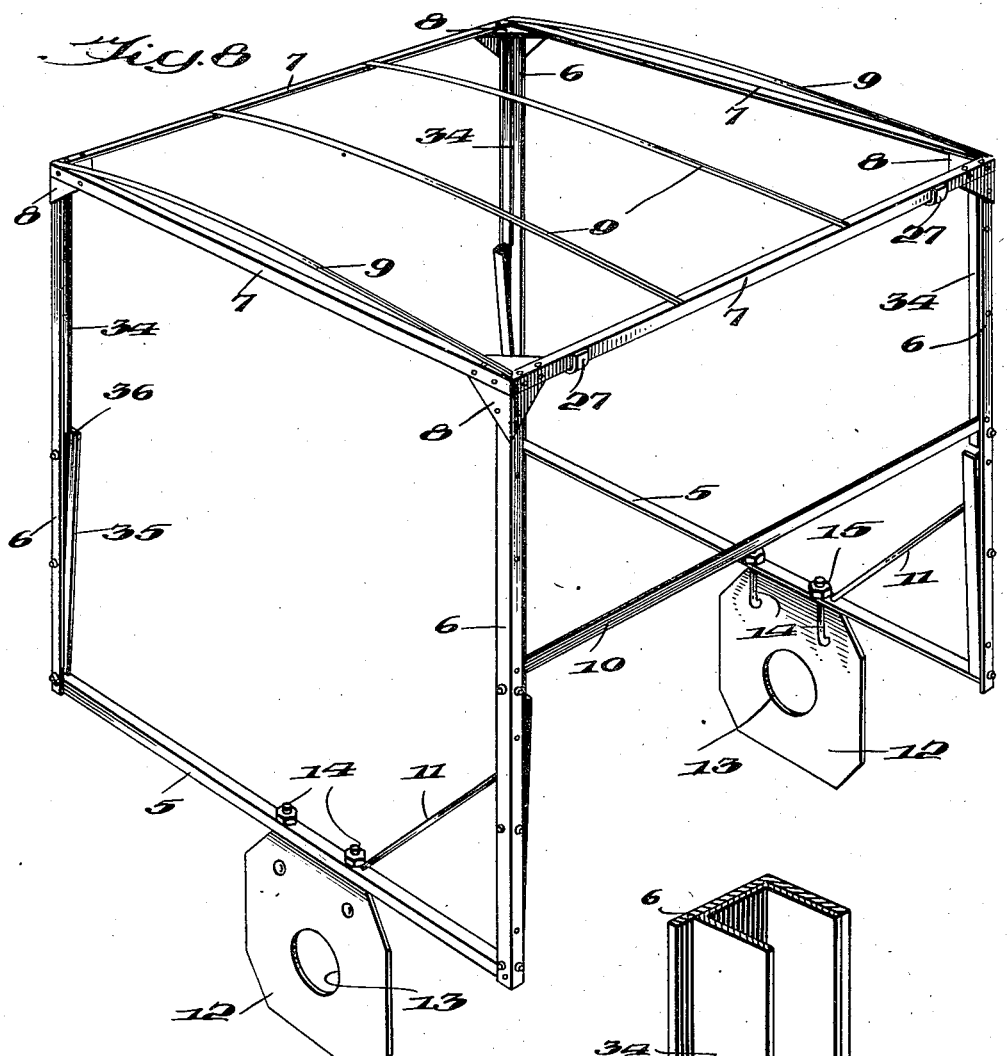
Fig. 8 is a perspective view of the tractor frame.
Fig. 9 is a perspective view of one of the window guide channels.

The frame structure of the cab is shown generally in Figs. 4 and 8, particularly the latter, which illustrate this frame as constructed preferably of angle bars, such as angle irons, rigidly attached together by welding, riveting, bolting, etc. The frame is shown as provided with side beams 5 on opposite sides thereof, from the free ends of which extend upright corner posts 6. The upper ends of the corner posts 6 are joined together by top side bars 7. At each corner of the frame at the top thereof is a corner brace formed of sheet metal in the shape of a triangular cap which is designated generally by the numeral 8 and which cap is seated upon the upper end of each corner post 6, embracing the outer sides thereof, with a horizontal gusset portion which lies within the horizontal flanges of the angular side bars 7, as shown in Fig. 8.

Each of the caps 8 is rigidly secured by riveting, welding, bolting, or other usual fastening means, securely to its corner post 6 and to the vertical and horizontal flanges of the respective angle bars 7 mounted thereon. This serves as an effective brace for each corner of the frame at the top thereof, maintaining the rigidity of the structure with comparatively little weight.

The top side bars 7 at the forward and rear sides of the frame are shown as joined together by cross bows 9 to provide longitudinal curvature for the top, although it is evident that other shaping structure may be provided as desired to impart other shapes and configurations to the top and to provide the desired curvature and slope thereto. As shown also in Fig. 8, the entire rear side of the frame structure is open to provide ready accessibility to the operator when the rear wall is removed or open, but the front corner posts 6 are shown as joined together by an intermediate cross bar 10 which is arranged to extend across above the controls for the tractor while providing a brace for the frame structure. Corner braces are also provided at 11 for bracing the lower front corners of the frame.

The cab may be secured in place on the tractor by the usual supporting plates or by brackets, fenders, etc. As a means of readily securing the cab to the tractor, the usual supporting plates 12 normally provided as a part of one form commercial tractors, are shown underlying the side beams 5 and provided with openings 15 therein through which the rear axle housings 4 extend. These plates 12 are secured rigidly directly on the axle housings or to the side portions of the tractor. The supporting plates 12 are securely anchored to the frame by J-bolts 14, the heads of which extend through holes in the supporting plates 12 on opposite sides of the axle housings, while the shanks of said bolts extend through the horizontal flanges of the side beams 5, to which they are secured by nuts 15. The J-bolts 14 anchor each plate 12 in abutting relation against the vertical flange of its side beam 5, as shown in Figs. 4, 5 and 6.

A modified form of fastening is shown in Fig. 7 in which bolts 16 extend directly through the supporting plate 12 and the vertical flange of the side beam 5 to anchor the same together, the bolts 16 being used in place of the J-bolts 14.

The supporting plates 12 are usually secured rigidly on the axle housings, forming parts of the drive housings, and remain in place on the tractor. When it is desired to remove the cab from the tractor, it is only necessary to remove the nuts 15 and lift the frame off of the bolts 14, or to remove the bolts 16, when the frame is readily detached from the tractor for removal. This is reversed when the frame is applied to the tractor, it being secured in place thereon by the bolts and is held rigidly in position on the supporting plates 12 so long as it is used.

The frame shown in Fig. 8 is enclosed to provide the desired and necessary protection from the elements, the covering material being preferably fabric, canvas, or the like, although it is evident that the frame may be covered with sheet metal, if desired. Suitable windows are provided in the respective sides for full visibility, as shown in Fig. 4.

Figure 2:
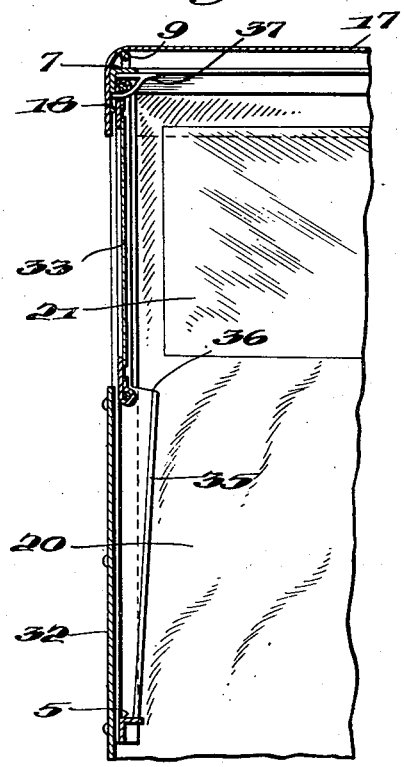
Fig. 2 is a vertical sectional view through one side of the tractor cab.
Figure 3:
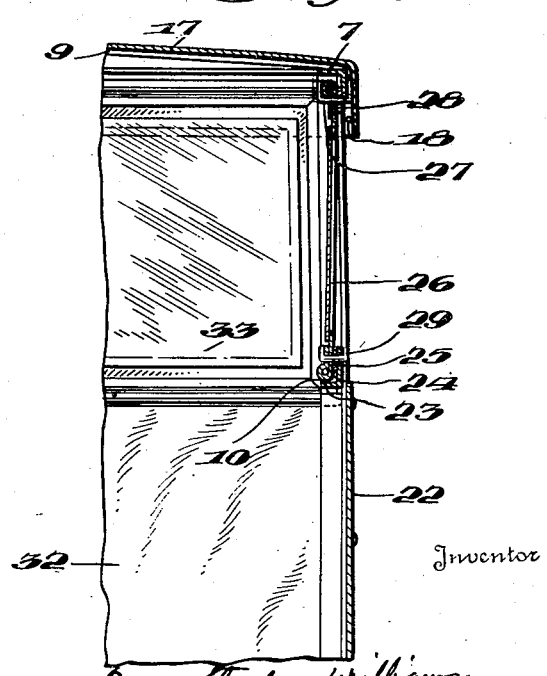
Fig. 3 is a similar view through the front wall portion of the tractor cab.

In the form illustrated, the top of the frame is enclosed within a fabric top covering 17, which extends across the bows 9 and around the top side bars 7, this fabric covering being shown as held in place by means of a draw string in the hem or inner flap of the covering 17, as shown at 18 in Figs. 2, 3 and 4, which draw string is provided with a spring 19 therein to hold the draw string under tension and to prevent accidental removal of the covering material 17 from the frame. The covering material may be readily removed, however, merely by loosening the draw string and raising the side flaps.

The back end portion of the cab is shown as closed by a fabric or sheet material back wall 20 which is provided preferably with a window 21 therein, as shown in Fig. 2. The fabric back wall 20 may be secured to the frame by detachable fastenings, snaps, or the like, for ready removal when use of back wall is not desired or for easy opening permitting ingress to or egress from the interior of the cab.

The front wall is designated generally by the numeral 22, as shown in Figs. 3 and 4 and is provided with suitable openings for the operating parts of the tractor. The front wall 22 is shown as extending only part way of the height of the cab, and having a front window 23 thereabove securely fastened to the frame. The window 23 is formed preferably of a wire frame or bar frame 24, enclosed by a fabric or sheet material 25 containing a sheet of transparent material 26 therein.

As shown in Figs. 3 and 4, the front window 23 is capable of being opened or removed when desired, for which purpose it is shown as carried by hooks 27 attached to the front top bar 7, with reinforcements 28 on the fabric strip 25 through which the hooks 27 pass. This forms a pivotal support for the window 23, at the upper edge thereof, and the lower edges may be held in place by fastening bolts 29 journaled for turning movement to register with elongated openings in reinforcements 31 secured to the lower edge portion of the fabric frame 25.

Each opposite side of the frame is enclosed by a side wall 32, preferably of fabric and detachably secured to the frame by snap fastenings or other means. Above the sides 32 are windows designated generally by the numeral 33, each of which is constructed preferably in a manner similar to the window 23 at the front, as described above. Each of the side windows 33 is preferably removable and capable of downward sliding movement in the frame, for which purpose, channel guides 34 are secured within the forward and rearward corner posts 6 and opening in rearward and forward directions, respectively, as shown particularly in Figs. 8 and 9. These channels 34 are rigidly secured to the corner posts as by welding, riveting or other fastenings, and are sufficiently wide to receive the windows 33 slidably therein for vertical adjustment. The lower portion of each channel guide 34 is flared inwardly at 35 to provide an entrance mouth at 36, permitting the ready introduction or removal of the window 33 therethrough. It will be evident from Figs. 2 and 9 that a window 33 may be slid downward in its guides 34 to the side beam 5, and then tilted inwardly sufficient to be aligned with the mouth 36, when it may be readily withdrawn from the guides and removed entirely. When the windows are not required they may be so removed or lowered to the lower portions of the guides 34. When it is desired to fasten the window 33 closed, a bolt 37 may be used for the purpose being pivotally connected with the inner side of the top side bar 7, and having provision for engaging the window 33 in its elevated position to hold the same against downward sliding movement in the guides.

The closure portions of the cab are preferably formed of canvas or other suitable fabric material, and are shown as secured in place on the frame by snap fasteners or other forms of fastenings, designated generally by the numeral 38. However, where the side walls are of sheet metal, they are preferably secured to the frame by rivets, bolts, or the like which permanently fasten the same thereto. The detachable fastenings for the rear curtain 20 are particularly desirable inasmuch as they allow the operator to gain access to the cab in a simple and convenient manner.

The shape and structural characteristics of the cab may be modified as found necessary to accommodate it to the varying dimensions and constructions of different tractors, but utilizing the same principle of construction and assembly as herein described.

I claim:

1. The combination with a tractor having an operator supporting portion, of a tractor cab enclosing said portion, said cab including a unitary frame structure having upright corner posts at the sides and a top carried thereby and with sheet covering material thereon about the sides thereof and secured to the corner posts by detachable fastenings for removal therefrom, and means for fastening said cab to the tractor.

2. The combination with a motor vehicle tractor having an operator supporting portion and having supporting plates with axle housings passing therethrough and permanently attached thereto on opposite sides of said operator supporting portion, said plates having the upper edges thereof above the axle housings, of a tractor cab enclosing said operator supporting portion, said cab including a unitary frame structure having supporting side members extending transversely above the axle housings and with upstanding posts carried thereby, a top carried by the posts, means secured to the posts for enclosing the cab, and means for detachably connecting the side members directly with the upper edge portions of the supporting plates for securing the cab to the tractor.

3. The combination with a wheeled motor vehicle tractor having an operator supporting portion and having axle housings on opposite sides thereof, supporting plates permanently attached to said housings, of a tractor cab enclosing said portion, said cab including a unitary frame structure with covering material thereon, and means for rigidly fastening said frame structure to the supporting plates for securing the cab in place on the tractor.

4. A tractor cab comprising a pair of laterally spaced side supporting beams, upright corner posts carried by the beams, top frame side members extending between and connecting said posts together, a top covering extending over said top frame side members, side covering means extending between the posts for enclosing the sides of the cab, the forward and rearward corner posts at each side of the cab having opposed guideways therein, each guideway having an inwardly flared portion at the inner side thereof with an entrance mouth at the upper end of said flared portion, and a window slidable through the respective entrance mouths and in the guideways.

5. In a tractor cab, a frame structure having spaced upright posts, said posts having guideways connected therewith and open in opposing directions, each of said guideways having an upwardly extending side extending continuously throughout the length thereof and having the opposite side thereof at the upper end portion of the guideway extending parallel with said continuous side with a laterally flared lower portion out of alignment with the upper portion of the side forming an entrance mouth therebetween at the upper end of said flared side adapted to receive a window for sliding movement in the guideways.

6. In a tractor cab, a frame structure having spaced upright angle bar posts, said posts having guide channels secured within the angles thereof and open in opposing directions, each of said guide channels having a laterally flared side extending at an acute angle to the length of the channel and with an entrance mouth at the upper end of said flared side adapted to receive a window therein for sliding movement in the guide channels.

7. In a tractor cab, a frame structure having spaced upright angle bar posts, said posts having guide channels secured within the angles thereof and open in opposing directions, each of said guide channels having a laterally flared side portion inclined out of alignment with the remaining portion of said side and having an entrance mouth at the upper end of said flared portion, and a window slidably mounted in the guide channels and adapted for removal through the entrance mouths thereof.

8. In a tractor cab, a frame structure comprising a pair of laterally spaced supporting beams, upright corner posts carried thereby and adapted to receive covering material thereon, top frame side bars joining together the upper ends of the corner posts and adapted to receive covering material thereover, and sheet-metal caps seated on the posts externally thereof between the same and the side bars and secured respectively to said posts and side bars forming gusset connections therebetween.

9. The combination with a wheeled motor vehicle tractor chassis comprising a power plant, an operating portion and having axle housings on opposite sides thereof, and supporting plates surrounding and permanently attached to said housings, of a tractor cab enclosing said operating portion of the tractor, said cab comprising a unitary frame structure separate from the chassis and having side sills extending transversely over the axle housings, and means for detachably fastening said side sills to the upper portions of the supporting plates above the axle housings for supporting the tractor cab on the chassis and for removal therefrom.

10. The combination with a wheeled motor vehicle tractor chassis comprising a power plant, an operating portion and having axle housings on opposite sides thereof, and supporting plates surrounding and permanently attached to said housings, of a tractor cab enclosing said operating portion of the tractor, said cab comprising a unitary frame structure separate from the chassis and having side sills extending transversely over the axle housings and seated upon the upper edges of the supporting plates for supporting the tractor cab on the chassis and for removal therefrom, and detachable fastenings connecting the supporting plates with the side sills.

11. The combination with a wheeled motor vehicle tractor chassis comprising a power plant, an operating portion and having axle housings on opposite sides thereof, and supporting plates surrounding and permanently attached to said housings, of a tractor cab enclosing said operating portion of the tractor, said cab comprising a unitary frame structure separate from the chassis and having side sills extending transversely over the axle housings, each side sill being formed of an angle bar having a flange seated on the upper edge of the adjacent supporting plate and having a flange disposed beside said plate for supporting the tractor cab on the chassis and for removal therefrom, and bolt connections extending through the last-mentioned flanges and through the plates for detachably securing the frame structure to the plates.

12. A tractor cab comprising a pair of laterally spaced side sills formed of angle bars, upright corner posts formed of angle bars having the lower ends thereof rigidly attached to the front and rear opposite ends of the side sills, a cross bar connecting together the front corner posts spaced above the lower ends thereof and a top frame rigidly attached to and extending between the upper ends of the corner posts, the space between the rear corner posts being open and unobstructed from the top to the bottom thereof and the space between the front corner posts being open and unobstructed below the cross bar.

13. A tractor cab comprising a pair of laterally spaced side sills adapted to be secured on opposite sides of a tractor, upright corner posts having the lower ends thereof rigidly secured to the front and rear end portions of the side sills, a top structure rigidly attached to the upper ends of the corner posts and supported thereby, and a cross bar connecting together the front corner posts approximately midway of the height thereof in position to fit over the operative structure of the tractor, the space between said front corner posts below said cross bar being open and unobstructed.

14. A tractor cam comprising a rigid unitary frame having spaced side sills having means for detachably securing the same to a tractor, upstanding corner posts permanently attached to said sills, a top frame rigidly and permanently attached to said corner posts and supported thereby, covering material on said top frame, and covering material extending about the lower portion of the frame and secured thereto.

15. A tractor cab comprising a rigid unitary frame having spaced side sills having means for detachably securing the same to a tractor, upstanding corner posts permanently attached to said sills, a top frame rigidly and permanently attached to said corner posts and supported thereby, covering material on said top frame, sheet covering material extending between the lower portions of the corner posts and detachably secured thereto for enclosing the lower portion of the cab.

16. A tractor cab comprising a rigid unitary frame having spaced side sills having means for detachably securing the same to a tractor, upstanding corner posts permanently attached to said sills, a top frame rigidly and permanently attached to said corner posts and supported thereby, covering material on said top frame, sheet covering material extending between the lower portions of the corner posts and detachably secured thereto for enclosing the lower portion of the cab, windows in the upper portion of the cab between said covering material and the top thereof, and means for mounting said windows in the frame for removal therefrom.

17. A tractor cab comprising a frame structure having spaced upright posts at a side of the cab, each of said posts having a pair of ribs forming a guide channel therein with the open side of said channel toward the other posts, whereby a window may be slidably mounted in the channel, one of said ribs of each post having an entrance mouth therein to admit the window therethrough and the portion of said rib below said mouth extending substantially in a straight line throughout the length thereof and being laterally flared relative to the other rib thereof.

OSCAR STANLEY WILLIAMS.